(12) United States Patent
Kim et al.

(10) Patent No.: US 6,924,337 B2
(45) Date of Patent: Aug. 2, 2005

(54) GOLF BALLS INCORPORATING URETHANE COMPOSITIONS AND METHODS FOR MAKING THEM

(75) Inventors: Hyun Jin Kim, Carlsbad, CA (US); Hong Guk Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 33 days.

(21) Appl. No.: 10/301,358

(22) Filed: Nov. 20, 2002

(65) Prior Publication Data

US 2004/0097653 A1 May 20, 2004

(51) Int. Cl.⁷ .......................... A63B 37/12; C08G 18/86
(52) U.S. Cl. ..................... 525/130; 525/92 A; 525/127; 525/128; 525/453; 473/372; 473/373; 473/374; 473/378
(58) Field of Search ............................. 525/92 A, 127, 525/128, 130, 453, 454, 455; 473/372, 373, 374, 378, 377

(56) References Cited

U.S. PATENT DOCUMENTS

| | | | | |
|---|---|---|---|---|
| 2,729,618 A | * | 1/1956 | Muller et al. ................. 525/440 |
| 3,395,109 A | * | 7/1968 | Molitor et al. ............... 524/400 |
| 5,759,676 A | | 6/1998 | Cavallaro et al. ............ 428/215 |
| 5,976,035 A | | 11/1999 | Umezawa et al. ........... 473/364 |
| 6,083,119 A | | 7/2000 | Sullivan et al. .............. 473/354 |
| 6,117,024 A | | 9/2000 | Dewanjee .................... 473/351 |
| 6,123,628 A | | 9/2000 | Ichikawa et al. ............ 473/371 |
| 6,132,324 A | | 10/2000 | Hebert et al. ................ 473/378 |
| 6,152,836 A | | 11/2000 | Bradley et al. .............. 473/378 |
| 6,190,268 B1 | | 2/2001 | Dewanjee .................... 473/370 |
| 6,203,450 B1 | * | 3/2001 | Bradley et al. .............. 473/351 |
| 6,210,294 B1 | | 4/2001 | Wu .............................. 473/377 |
| 6,213,892 B1 | | 4/2001 | Felker et al. ................ 473/370 |
| 6,267,694 B1 | * | 7/2001 | Higuchi et al. .............. 473/374 |
| 6,284,840 B1 | * | 9/2001 | Rajagopalan et al. ...... 525/92 A |
| 6,290,614 B1 | | 9/2001 | Kennedy, III et al. ....... 473/378 |
| 6,303,704 B1 | * | 10/2001 | Nesbitt ...................... 525/333.8 |
| 6,309,313 B1 | | 10/2001 | Peter ........................... 473/378 |
| 6,319,152 B1 | | 11/2001 | Takesue et al. ............. 473/371 |
| 6,369,125 B1 | | 4/2002 | Nesbitt ....................... 522/142 |
| 6,392,002 B1 | | 5/2002 | Wu ............................... 528/76 |
| 6,422,954 B1 | | 7/2002 | Dewanjee .................... 473/378 |
| 6,435,986 B1 | | 8/2002 | Wu et al. ..................... 473/378 |
| 6,435,987 B1 | | 8/2002 | Dewanjee .................... 473/378 |
| 6,476,176 B1 | | 11/2002 | Wu ............................... 528/76 |
| 2001/0039220 A1 | | 11/2001 | Kennedy, III et al. ....... 473/378 |
| 2002/0006837 A1 | | 1/2002 | Dalton et al. ................ 473/361 |
| 2002/0016435 A1 | | 2/2002 | Simonutti et al. ............ 528/59 |
| 2002/0039936 A1 | | 4/2002 | Binette et al. .............. 473/374 |
| 2002/0049099 A1 | | 4/2002 | Peter ........................... 473/378 |
| 2002/0086743 A1 | | 7/2002 | Bulpett et al. .............. 473/371 |
| 2002/0091018 A1 | | 7/2002 | Sasaki et al. ................ 473/367 |
| 2002/0098918 A1 | | 7/2002 | Wu et al. ..................... 473/377 |
| 2002/0119833 A1 | | 8/2002 | Dewanjee .................... 473/371 |
| 2002/0160863 A1 | | 10/2002 | Wu et al. ..................... 473/378 |

* cited by examiner

*Primary Examiner*—David J. Buttner
(74) *Attorney, Agent, or Firm*—Sheppard, Mullin, Richter & Hampton LLP

(57) ABSTRACT

A golf ball that includes a core and a cover layer. The cover layer encases the core, and includes a composition of a thermoplastic urethane, formed as a reaction product of a diol or a polyol with an isocyanate and a peroxide.

25 Claims, No Drawings

US 6,924,337 B2

GOLF BALLS INCORPORATING URETHANE COMPOSITIONS AND METHODS FOR MAKING THEM

BACKGROUND OF THE INVENTION

The present invention relates to compositions for use in making inner covers, outer covers, intermediate layers and cores for a golf ball, and it more specifically relates to such golf ball layers composed of post-crosslinkable urethane. The present invention also relates to methods of manufacture of golf balls incorporating these layers.

Golf balls generally include a core and at least one cover layer surrounding the core. Balls can be classified as two-piece, multi layer, or wound balls. Two-piece balls include a spherical inner core and an outer cover layer. Multi-layer balls include a core, a cover layer and one or more intermediate (or mantle) layers. The intermediate layers themselves may include multiple layers. Wound balls include a core, a rubber thread wound under tension around the core to a desired diameter, and a cover layer, typically of balata material.

Generally, two-piece balls provide good durability and ball distance when hit, but they provide poor ball control, due to low spin rate and poor "feel" (the overall sensation transmitted to the golfer while hitting the ball). Wound balls having balata covers generally have high spin rate, leading to good control, and good feel, but they have short distance and poor durability in comparison to two-piece balls. Multi-layer balls generally have performance characteristics between those of two-piece and wound balls. Multi-layer balls exhibit distance and durability inferior to two-piece balls but superior to wound balata balls, and they exhibit feel and spin rate inferior to wound balata balls but superior to two-piece balls.

Material characteristics of the compositions used in the core, cover, and any intermediate layers are important in determining the performance of the resulting golf balls. In particular, the composition of the cover layer is important in determining the ball's durability, scuff resistance, speed, shear resistance, spin rate, feel, and "click" (the sound made when a golf club head strikes the ball). Various materials having different physical properties are used to make cover layers to create a ball having the most desirable performance possible. For example, many modern cover layers are made using soft or hard ionomer resins, elastomeric resins or blends of these. Monomeric resins used generally are ionic copolymers of an olefin and a metal salt of a unsaturated carboxylic acid, or ionomer terpolymers having a co-monomer within its structure. These resins vary in resiliency, flexural modulus, and hardness. Examples of these resins include those marketed under the name SURLYN manufactured by E.I. DuPont de Nemours & Company of Wilmington, Del., and IOTEK manufactured by Exxon Mobil Corporation of Irving, Tex. Elastomeric resins used in golf ball covers include a variety of thermoplastic or thermoset elastomers available. Layers other than cover layers also significantly affect performance of a ball. The composition of an intermediate layer is important in determining the ball's spin rate, speed, and durability. The composition and resulting mechanical properties of the core are important in determining the ball's coefficient of restitution (C.O.R.), which affects ball speed and distance when hit. In addition to the performance factors discussed above, processability also is considered when selecting a formulation for a golf ball composition. Good processability allows for ease of manufacture using a variety of methods known for making golf ball layers, while poor processability can lead to avoidance of use of particular materials, even when those materials provide for good mechanical properties.

Various materials having different physical properties are used to make ball layers to create a ball having the most desirable performance possible. Each of the materials discussed above has particular characteristics that can lead to ball properties when used in a golf ball composition, either for making a ball cover, intermediate layer, or core. However, one material generally cannot optimize all of the important properties of a golf ball layer. Properties such as feel, speed, spin rate, resilience and durability all are important, but improvement of one of these properties by use of a particular material often can lead to worsening of another. For example, ideally, a golf ball cover should have good feel and controllability, without sacrificing ball speed, distance, or durability. Despite the broad use of copolymeric ionomers in golf balls, their use alone in, for example, a ball cover can be unsatisfactory. A cover providing good durability, controllability, and feel would be difficult to make using only a copolymeric ionomer resin having a high flexural modulus, because the resulting cover, while having good distance and durability, also will have poor feel and low spin rate, leading to reduced controllability of the ball. Also, the use of particular elastomeric resins alone can lead to compositions having unsatisfactory properties, such as poor durability and low ball speed.

Therefore, to improve golf ball properties, the materials discussed above can be blended to produce improved ball layers. Prior compositions for golf balls have involved blending high-modulus copolymeric ionomer with, for example, lower-modulus copolymeric ionomer, terpolymeric ionomer, or elastomer. As discussed above, ideally a golf ball cover should provide good feel and controllability, without sacrificing the ball's distance and durability. Therefore, a copolymeric ionomer having a high flexural modulus often is combined in a cover composition with a terpolymeric ionomer or an elastomer having a low flexural modulus. The resulting intermediate-modulus blend possesses a good combination of hardness, spin and durability.

However, even with blending of materials to improve ball properties, use of the materials and blends discussed above has not been completely satisfactory. Improving one characteristic can lead to worsening of another. For example, blending an ionomer having a high flexural modulus with an ionomer having a low flexural modulus can lead to reduced resilience and durability compared to use of the high-modulus ionomer alone. Also, the hardness of the compositions that can be obtained from these blends are limited, because durability and resilience get worse when hardness is lowered by increasing terpolymeric content of these blends. In general, it is difficult to make materials for use in, for example, a golf ball cover layer that possess good feel, high speed, high resilience, and good shear durability, and that are within a wide range of hardness. Additional compositions meeting these criteria are therefore needed.

Conventionally, golf ball cover and intermediate layers are positioned over a core or other internal layer using one of three methods: casting, injection molding, or compression molding. Of the three methods, injection molding is most preferred, due to the efficiencies gained by its use. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. The mold sections are connected to openings, or gates, evenly distributed near or around the parting line, or point of intersection, of the mold sections through which the material to be molded flows into the cavity. The gates are connected to a runner and a sprue that serve to channel the molding material through the gates. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold. In the case of a heated mold, thermal energy is applied to the material in the mold so that a chemical reaction may take place in the material. Because thermoset materials have desirable mechanical properties, it would be beneficial to producers of golf balls using this process. Unfortunately, thermoset materials generally are not well suited for injection molding, because as the reactants for thermoset polyurethane are mixed, they begin to cure and become highly viscous while traveling through the sprue and into the runners of the injection mold, leading to injection difficulties. For this reason, thermoset materials typically are formed into a ball layer using a casting process free of any injection molding steps.

In contrast to injection molding, which generally is used to prepare layers from thermoplastic materials, casting often is used to prepare layers from thermoset material (i.e., materials that cure irreversibly). In a casting process, the thermoset material is added directly to the mold sections immediately after it is created. Then, the material is allowed to partially cure to a gelatinous state, so that it will support the weight of a core. Once cured to this state, the core is positioned in one of the mold sections, and the two mold sections are then mated. The material then cures to completion, forming a layer around the core. The timing of the positioning of the core is crucial for forming a layer having uniform thickness. The equipment used for this positioning are costly, because the core must be centered in the material in its gelatinous state, and at least one of the mold sections, after having material positioned therein, must be turned over and positioned onto its corresponding mold section. Casting processes often lead to air pockets and voids in the layer being formed, resulting in a high incidence of rejected golf balls. The cost of rejected balls, complex equipment, and the exacting nature of the process combine to make casting a costly process in relation to injection molding.

Compression molding of a ball layer typically requires the initial step of making half shells by injection molding the layer material into a cold injection mold. The half shells then are positioned in a compression mold around a ball core, whereupon heat and pressure are used to mold the half shells into a complete layer over the core. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

One material used in ball layers is polyurethane. Polyurethane typically is formed as the reaction product of a diol or polyol, along with an isocyanate. The reaction also can incorporate a chain extender configured to harden the polyurethane formed by the reaction. Thermoplastic polyurethanes have generally linear molecular structures and incorporate physical crosslinking that can be reversibly broken at elevated temperatures. As a result, thermoplastic polyurethanes can be made to flow readily, as is required for injection molding processes. In contrast, thermoset polyurethanes have generally networked structure that incorporate irreversible chemical crosslinking. As a result, thermoset polyurethanes do not flow freely, even when heated.

Thermoplastic and thermoset polyurethanes both have been used in golf ball layers, and each provides for certain advantages. Because of their excellent flowability, thermoplastic polyurethanes can be positioned readily around a golf ball core using injection molding. Unfortunately, golf ball covers comprising thermoplastic polyurethane exhibit poor shear-cut resistance. Thus, while thermoplastic polyurethane covers are less expensive to make due to their superior processability, they are not favored due to the resulting inferior ball performance. In contrast, thermoset polyurethane exhibits high shear-cut resistance and is much more scuff- and cut-resistant than thermoplastic polyurethane. However, the irreversible crosslinks in the thermoset polyurethane structure make it unsuitable for use in injection molding processes conventionally used for thermoplastic materials.

Despite their drawbacks, thermoplastic polyurethanes are used in golf ball compositions. U.S. Pat. No. 5,759,676 to Wu discloses thermoplastic polyurethane utilized in blends for mantle and cover layers. U.S. Pat. No. 6,319,152 to Takesue teaches blending of a thermoplastic polyurethane with a styrene-based block copolymer to increase the scuff resistance of the resulting golf ball cover. The patent discloses that because thermoplastic polyurethanes are "inexpensive and easy to mold, these elastomers are regarded as an excellent cover stock substitute for balata material. However, the thermoplastic polyurethane elastomers are still insufficient in scuff resistance upon iron shots." Thermoplastic polyurethanes also are used for making mantle layers to give the feel of a wound ball to non-wound constructions. Such a mantle is disclosed in U.S. Pat. No. 5,759,676 to Cavallaro et al.

Though they are more expensive to process than thermoplastic polyurethanes, thermoset polyurethanes also have been used in golf ball layers. For instance, U.S. Pat. No. 6,132,324 to Hubert discloses a golf ball having a cover formed from thermoset polyurethane. The patent teaches a method for casting a thermoset polyurethane cover over an ionomer inner layer, including a step of measuring the viscosity "over time, so that the subsequent steps of filling each mold half, introducing the core into one half and closing the mold can be properly timed for accomplishing centering of the core cover halves fusion and overall uniformity." The additional steps involved in casting a layer over those needed for injection molding the layer lead to added complexity and expense. Another patent discussing use of thermoset polyurethane is U.S. Pat. No. 6,435,987 to Dewanjee. This patent teaches thermosetting polyurethane comprising a toluene diisocyanate-based prepolymer, a second diisocyanate prepolymer, and a curing agent. Again, this method makes use of casting because the materials used would not be well suited to injection molding.

One method for injection molding of a polyurethane is by using a post-crosslinkable thermoplastic polyurethane. This is a thermoplastic polyurethane which, upon irradiation, is capable of crosslinking to form a thermoset polyurethane.

U.S. Pat. No. 6,369,125 to Nesbitt discloses such an approach, whereby a thermoplastic polyurethane having unsaturated carbon-carbon bonds is exposed to electromagnetic radiation to induce crosslinking and form thermosetting polyurethane. The process used in this patent utilizes a co-agent such as a hydroxyl terminated polybutadiene, which enables thermoplastic polyurethane to crosslink upon exposure by radiation. However, the use of radiation is undesirable because its depth of exposure cannot be controlled. As a result, the radiation will travel through the entire ball, affecting parts of the ball other than the layer being molded. For example, certain elastomeric materials used as thread in wound layers are susceptible to degradation from radiation. Once degraded, the thread may snap when the golf ball is struck by a golf club. Radiation also can cause additional crosslinking in the core, ultimately producing a core that is harder than desired, resulting in a degradation of ball performance. Besides the effect on other parts of the ball, radiation also can adversely affect materials blended with the polyurethane to increase or decrease certain ball control properties, such as distance and spin. Finally, radiation causes thermoplastic polyurethane to turn from white to yellow. Though this may be avoided by using antioxidants, these antioxidants may retard crosslinking and thereby frustrate the purpose of irradiation. For these reasons, irradiation of thermoplastic polyurethane to cause crosslinking is not preferred.

In view of the above, it is apparent that polyurethane golf balls that provide the optimal ball performance properties of a thermoset polyurethane, while retaining the superior processability of a thermoplastic polyurethane, as well as methods for making these balls, are needed. The present invention fulfills this need and provides further related advantages.

SUMMARY OF THE INVENTION

The present invention relates to new and improved golf balls that overcome the above-referenced problems. Golf balls within the scope of the invention can be solid, wound, two-piece, or multi-layered golf balls.

The present invention resides in a golf ball that includes a core and a cover layer encasing the core. The cover layer incorporates a thermoplastic urethane, formed as a reaction product of a diol or a polyol with an isocyanate; and a peroxide. The urethane preferably is a reaction product of a diol or polyol and an isocyanate, optionally also with reaction of chain extenders. Preferably, the reaction product is substantially free of unsaturated aliphatic hydrocarbons. The polyol preferably is selected from a polyester polyol, a polycarbonate polyol, a polyether polyol, a polybutadiene polyol or mixtures thereof. Chain extenders, preferably include a polyol, a diisocyanate, a diamine, or mixtures of these. The peroxide preferably is selected from aliphatic peroxides, aromatic peroxides, cyclic peroxides, or mixtures of these, and it has a one-hour half-life temperature greater than about 50° C. Preferably, the ratio by weight of reactant product to the peroxide ranges between 99.9:0.1 and about 90:10.

The golf ball material of the present invention also may include plasticizers, ionomeric polymers, non-ionomeric polymers, polyamides, silicone materials, styrenic-copolymers, or mixtures of these. Additionally, the material may include fillers, stabilizers, colorants, processing aids, antioxidants, or mixtures of these.

The present invention also is embodied in a golf ball incorporating a core, a cover, and one or more intermediate layers, in which one or more of the core, cover or intermediate layers incorporates the above-described ball material. The core may include an inner core and outer core, and the core also may comprise a liquid. Additionally, the golf ball may incorporate one or more layers of elastomeric thread situated between the core and the cover. The ball cover can include copolymeric ionomer, terpolymeric ionomer or mixtures of these. The ball cover also can include elastomeric material.

Other features and advantages of the present invention should become apparent from the following detailed description of the preferred embodiments.

DETAILED DESCRIPTION OF THE PREFERRED EMBODIMENTS

The present invention is embodied in golf balls incorporating compositions incorporating a post-crosslinkable thermoplastic urethane and a peroxide as a crosslinking agent. The present invention also is embodied in golf ball covers, intermediate layers, and cores made from the above-specified composition, and it additionally resides in methods of manufacture of balls incorporating these compositions. The combination of the post-curable thermoplastic urethane and peroxide allows for formation of golf ball layers that are easily processable and, upon exposure to sufficient heat and/or pressure, become thermoset polyurethane providing superior ball performance. These compositions are easy to use, and they provide flexibility in golf ball design to improve ball performance, such as hit feel and spin rate, without adversely affecting shear-cut resistance of the ball. The compositional also allows for scrap material not crosslinked to be salvaged for later use.

Preferred embodiments of the present invention suitable for use in make golf ball cores, intermediate layers, or covers include compositions comprising: (a) a thermoplastic urethane that is the reaction product of a diol or polyol and an isocyanate, with or without a chain extender; and (b) a peroxide crosslinking agent. Before the composition is exposed to sufficient thermal energy to reach the activation temperature of the peroxide, the composition of (a) and (b) behaves as a thermoplastic material. Therefore, it can readily be formed into golf ball layers using injection molding. However, when sufficient thermal energy is applied to bring the composition above the peroxide activation temperature, crosslinking occurs, and the thermoplastic polyurethane is converted into crosslinked polyurethane.

The crosslink density (or amount of crosslinking) of the compositions can be adjusted by varying the amount or type of component (b) (i.e., peroxide) in the composition. The amount of crosslinking is also controlled by the temperature of the composition and the amount of time at which the composition is elevated above an activation temperature of the peroxide. It is understood that the crosslinking of the current invention includes either partial or full chemical crosslinking. Preferably, the ratio by weight of component (a) to component (b) ranges between 99.9:0.1 and about 90:10, more preferably between 99.9:0.1 and about 93:7, even more preferably between 99.9:0.1 and about 95:5, and most preferably between 99.9:0.1 and about 97:3.

Isocyanates used for making the thermoplastic urethanes of the present invention encompass diisocyanates and polyisocyanates. Examples of suitable isocyanates include the following: trimethylene diisocyanate, tetramethylene diisocyanate, pentamethylene diisocyanate, hexamethylene diisocyanate, ethylene diisocyanate, diethylidene diisocyanate, propylene diisocyanate, butylenes diisocyanate, bitolylene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis (isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzylisocyanate, dichlorohexamethylene diisocyanate, ω, ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in a combination. These combination isocyanates include triisocyanates, such as biuret of hexamethylene diisocyanate and triphenylmethane triisocyanates, and polyisocyanates, such as polymeric diphenylmethane diisocyanate.

Polyols used for making the thermoplastic polyurethane of the present invention include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids Adipic acid is used for materials requiring added flexibility, whereas phthalic anhydride is used for those requiring rigidity. Some examples of polyester polyols include poly (ethylene adipate) (PEA), poly(diethylene adipate) (PDA), poly(propylene adipate) (PPA), poly(tetramethylene adipate) (PBA), poly(hexamethylene adipate) (PHA), poly (neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Preferably, those polyester polyols have molecular weight of at least 500. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The preferred polyether polyols have molecular weight of at least 500 and may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols typically have a molecular weight in a range of about at least 500, and can be used either alone or in a combination with other polyols.

Polybutadiene polyol includes liquid diene polymer containing hydroxyl groups having a molecular weight of at least 600, and an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

As discussed above, the compositions incorporate at least one peroxide as a crosslinking agent. The peroxide used often is chosen by its reactivity, which typically is indicated by its one-hour half-life temperature (half-life temperature). Another indication of peroxide reactivity is its activation temperature, which differs from and is lower than its half-life temperature. Because the decomposition of peroxide is slow at its activation temperature, compositions of the present invention elevated to the activation temperature would take many hours, or even days, to sufficiently crosslink to form the thermoset compositions of the present invention. For this reason, it generally is the half-life temperature that is taken into consideration when determining the timing and temperature of the processing of the composition. The peroxide used should be selected to prevent a significant amount of premature crosslinking during, for example, injection molding or blending of the composition. Often, during processing of the composition, the temperature of the composition is raised to increase its fluidity. In the case of the present invention, the processing temperature of the composition generally will be raised above the activation temperature of the peroxide, and it also may be raised above the half-life temperature of the peroxide in the composition. However, the composition is processed quickly at these temperatures and is cooled (either actively or passively) before substantial crosslinking can occur. Once the composition is positioned around a core to form a layer, additional thermal energy then can be added to the layer to raise the temperature well above the half-life temperature and induce further crosslinking in the thermoplastic urethane to form a thermoset polyurethane. Preferably, the half-life temperature of the peroxide is above 50° C., more preferably above 60° C., still more preferably above 70° C., and most preferably above 80° C.

Examples of suitable peroxides for use in compositions within the scope of the present invention include aliphatic peroxides, aromatic peroxides, cyclic peroxides, or mixtures of these. Primary, secondary, or tertiary peroxides can be used, with tertiary peroxides most preferred. Also, peroxides containing more than one peroxy group can be used, such as 2,5-bis-(ter.butylperoxy)-2,5-dimethyl hexane and 1,4-bis-(ter.butylperoxyisopropyl)-benzene. Also, peroxides that are either symmetrical or asymmetrical can be used, such as tert.butylperbenzoate and tert.butylcumylperoxide. Additionally, peroxides having carboxy groups also can be used. Decomposition of peroxides used in compositions within the scope of the present invention can be brought about by applying thermal energy, shear, reactions with other chemical ingredients, or a combination of these. Homolytically decomposed peroxide, heterolytically decomposed peroxide, or a mixture of those can be used to promote crosslinking reactions in compositions within the scope of this invention. Examples of suitable aliphatic peroxides and aromatic peroxides, include diacetylperoxide, di-tert-butylperoxide, dibenzoylperoxide, dicumylperoxide, 2,5-bis-(t-butylperoxy)-2,5-dimethyl hexane, 2,5-dimethyl-2,5-di(benzoylperoxy)hexane, 2,5-dimethyl-2,5-di(butylperoxy)-3-hexyne, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 trimethylcyclohexane, and di(2,4-dichloro-benzoyl). Peroxides for use within the scope of this invention may be acquired from Akzo Nobel Polymer Chemicals of Chicago, Ill., Atofina of Philadelphia, Pa. and Akrochem of Akron, Ohio. Table 1 below provides examples of preferred peroxides and their corresponding half-life temperatures.

TABLE 1

| Trade name | Chemical Structure | Half-Life Temp (° C.) |
| --- | --- | --- |
| Marketed by Akzo Nobel: | | |
| Trigonox 145 | 2,5-Dimethyl-2,5-di (tert-butylperoxy)hexyne-3 | 157 |
| Trigonox B | Di-tert-butyl peroxide | 154 |

TABLE 1-continued

| Trade name | Chemical Structure | Half-Life Temp (° C.) |
| --- | --- | --- |
| Trigonox 101 | 2,5-Dimethyl-2,5-di (tert-butylperoxy)hexane | 147 |
| Trigonox T | Tert-butyl cumyl peroxide | 146 |
| Perkadox 14S-FL | Di(2-tert-butylperoxy-isopropyl)benzene | 146 |
| Perkadox BC | Dicumyl peroxide | 138 |
| Trigonox 17 | Butyl 4,4-di-(tert-butyl peroxy)valerate | 130 |
| Trigonox 29 | 1,1-Di-(tert-butylperoxy)-3,5,5-trimethylcyclohexane | 117 |
| Trigonox C | Tert-butyl peroxybenzoate | 110 |
| Trigonox 42 | t-butyl peroxy-3,5,5-trimethylhexanoate | 114 |
| Perkadox PM | Di(4-methylbenzoyl) Peroxide | 77 |
| Perkadox S | Dibenzoyl peroxide | 74 |
| Perkadox PD | Di(2,4-dichlorobenzoyl) peroxide | 65 |
| Perkadox TML | | |
| Marketed by Atofina: | | |
| Peroximon DC Luperox 500 | Dicumyl Peroxide | 137 |
| Peroximon F Luperox 802 | α,α'-Di(t-butyl peroxy)diisopropyl benzene | 139 |
| Luperox 101 | 2,5-Dimethyl-2,5-di-(t-butylperoxy)hexane | 140 |
| Luperox DI | Di-t-Butyl Peroxide | 149 |
| Luperox 130 | 2,5-Dimethyl-2,5-di-(t-butylperoxy)hexyne-3 | 152 |
| Marketed by Akrochem: | | |
| DCLBP | Di(2,4-Dichloro benzoyl) Peroxide | 72 |
| BP | Dibenzoyl Peroxide | 71 |
| TBPB | t-Butylperoxy Benzoate | 124 |
| TMCH | 1,1-di(t-butylperoxy)-3,3,5-trimethyl-cyclohexane | 115 |
| DHBP | 2,5-Dimethyl-2,5-Di (t-butylperoxy) Hexane | 143 |
| DYBP | 2,5-Dimethyl-2,5-Di (t-butylperoxy) Hexyne-3 | 148 |

As discussed above, compositions within the scope of the present invention also may incorporate chain extenders in (a) described above. These extenders may comprise any material generally used for hardening urethane prepolymer to produce polyurethane elastomer. Non-limiting examples include polyols, polyamine compounds, and mixtures of these. Polyol extenders may be primary, secondary, or tertiary polyols. Specific examples of monomers of these polyols include the following: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol. Diamines also can be added to urethane prepolymer to function as chain extenders. Suitable diamines include: tetramethylenediamine, pentamethylenediamine, hexamethylenediamine, p,p'-methylenedianiline, p-phenylenediamine and others. Aromatic diamines have a tendency to provide a stiffer (higher Mooney viscosity) product than aliphatic or cycloaliphatic diamines. Suitable polyamines that can be used as chain extenders include, any of a primary amine, a secondary amine and a tertiary amine, such as diamine, triamine and tetramine. Examples of these include: an aliphatic amine such as hexamethylenediamine;

an alicyclic amine such as 3,3'-dimethyl-4,4'-diaminodicyclohexyl methane, an aromatic amine such as 4,4'-methylene bis-2-chloroaniline, 2,2',3,3'-tetrachloro-4,4'-diaminophenyl methane or 4,4'-diaminodiphenyl; and 2,4,6-tris(dimethylaminomethyl) phenol. These extenders may be used either alone or in combination. Urethane prepolymer may be hardened by mixing it with chain extender using conventional methods, or by varying a mix ratio of the extender to the urethane prepolymer under proper processing conditions, such as processing temperature and processing time.

As described above, the urethane of the compositions of the present invention can be obtained from the reaction product of polyol and isocyanate. For example, in one method, polyol and isocyanate react to produce urethane prepolymer, and this urethane prepolymer may be reacted with a chain extender, including, but not limited to, polyol, diisocyanate, diamines, or mixtures of these. The designation of this reaction product as thermoplastic urethane or thermoplastic polyurethane is irrelevant, as each may be reacted with the peroxide as reaction product (a) of the present invention. Also for purposes of this invention, the exact composition of the thermoplastic urethane is not important, because thermoplastic urethane, either having or lacking unsaturated aliphatic hydrocarbons, will readily crosslink in the presence of peroxide, regardless of the polyol used for preparing the thermoplastic urethane. The present invention allows for use of thermoplastic urethanes lacking these unsaturated aliphatic hydrocarbons, because the peroxides used do not require the presence of these hydrocarbons to promote crosslinking in the thermoplastic urethane. This allows for greater versatility when selecting a thermoplastic urethane compared to previous methods of crosslinking using radiation. Upon heating to its activation temperature, peroxide forms peroxide radicals that can attack any bonds in the thermoplastic urethane, and not only carbon-carbon bonds. In fact, the peroxide radicals generally will attack the nitrogen-hydrogen and carbon-hydrogen bonds in the thermoplastic urethane to remove the hydrogen atom and create a radical (i.e., crosslinking site) on the urethane. When full crosslinking occurs, the thermoplastic urethane becomes thermoset polyurethane. For this reason, peroxide used in the composition preferably is selected, in part, to have an activation temperature sufficiently high such that the urethane in the composition will retain its thermoplastic properties such as during injection molding. Too low of an activation temperature will result in crosslinking of the composition before the injection molding process is completed, leading to process difficulties. In addition to peroxide activation temperature, the reactivity between the peroxide radical and the thermoplastic urethane selected also should be considered. As discussed above and shown below in Table 2, the amount of crosslinking is dependent on the particular peroxide and thermoplastic urethane selected.

Compositions within the scope of the present invention also may include plasticizers. Examples of suitable plasticizers include: dioctyl phthalate (DOP), dibutyl phthalate (DBP), dioctyl adipate (DOA), triethylene glycol dibenzoate, tricresyl phosphate, dioctyl phthalate, aliphatic ester of pentaerythritol, dioctyl sebacate, and diisooctyl azelate. In addition to the material discussed above, compositions within the scope of the present invention can incorporate one or more polymers in addition to the thermoplastic urethane and crosslinking agent. These additional polymers may be added as need for a desired effect, such as softening an otherwise overly hard cover composition. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Particularly suitable plasticizers for use in the compositions within the scope of the present invention include: polyethylene-terephthalate, polybutyleneterephthalate, polytrimethylene-terephthalate, ethylene-carbon monoxide copolymer, polyvinyl-diene fluorides, polyphenylenesulfide, polypropylene-oxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-(diene), dynamically vulcanized polypropylene/ethylene-propylene-diene-copolymer, thermoplastic vulcanizates based on ethylene-propylene-(diene), natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexylidicarboxylic acid, with (b) a diamine, such as ethylenediamine, tetramethylenediamine, pentamethylenediamine, hexamethylene-diamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46. Other preferred materials suitable for use as an additional material in compositions within the scope of the present invention include polyester elastomers marketed under the name SKYPEL by SK Chemicals of South Korea, or triblock copolymers marketed under the name HG-252 by Kuraray Corporation of Kurashiki, Japan. These triblock copolymers have at least one polymer block comprising an aromatic vinyl compound and at least one polymer block comprising a conjugated diene compound, and a hydroxyl group at a block copolymer. The materials listed above all can provide for particular enhancements to ball layers prepared within the scope of the present invention.

As mentioned above, ionomeric polymers often are found in covers and intermediate layers of golf balls. These ionomers also are well suited for blending into compositions within the scope of the present invention. Suitable ionomeric polymers (i.e., copolymer- or terpolymer-type ionomers) include α-olefin/unsaturated carboxylic acid copolymer-type ionomeric or terpolymer-type ionomeric resins that can be described as copolymer E/X/Y, where E represents ethylene, X represents a softening comonomer such as acrylate or methacrylate, and Y is acrylic or methacrylic acid. The acid moiety of Y is neutralized to form an ionomer by a cation such as lithium, sodium, potassium, magnesium, calcium, barium, lead, tin, zinc or aluminum. Also, a combination of such cations is used for the neutralization. Copolymeric ionomers are obtained by neutralizing at least portion of carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least portion of carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Terpolymeric ionomers include ionomers having varied acid contents and degrees of acid neutralization, neutralized by monovalent or bivalent cations discussed above. Examples of suitable ionomeric resins include those marketed under the name SURLYN manufactured by E. I. DuPont de Nemours & Company of Wilmington, Del., and IOTEK manufactured by Exxon Mobil Corporation of Irving, Tex.

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and, the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also may be added to compositions within the scope of the present invention. Examples of copolymers comprising epoxy monomers and which are suitable for use within the scope of the present invention include styrene-butadiene-styrene block copolymers, in which the polybutadiene block contains epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Compositions within the scope of the present invention also can include, in suitable amounts, one or more additional ingredients generally employed in golf balls and ball compositions. Agents provided to achieve specific functions, such as additives and stabilizers, can be present. Suitable ingredients include UV stabilizers, photostabilizers, antioxidants, colorants, dispersants, mold releasing agents, processing aids, and fillers. The compositions can incorporate, for example, inorganic fillers, such as titanium dioxide, calcium carbonate, zinc sulfide or zinc oxide. Additional fillers can be chosen to impart additional density to the compositions, such as zinc oxide, barium sulfate, tungsten or any other metallic powder having density higher than that of the base polymeric resin. Any organic or inorganic fibers, either continuous or non-continuous, also can be in the compositions. An example of these is silica-reinforcing filler. This filler preferably is selected from finely divided, heat-stable minerals, such as fumed and precipitated forms of silica, silica aerogels and titanium dioxide having a specific surface area of at least about 10 $m^2$/gram.

The thermoplastic urethane (or the isocyanate and diol/polyol constituents) and peroxide can be mixed together to form the composition of the present invention, with or without melting them. Dry blending equipment, such as a tumbler mixer, V-blender, or ribbon blender, can be used to mix the compositions. The peroxide can be mixed together with thermoplastic urethane, or mixed with the constituents of thermoplastic urethane. The peroxide also can be added after addition of any of the additional materials discussed above. Materials can be added to the composition using a mill, internal mixer, extruder or combinations of these, with or without application of thermal energy to produce melting. In another method of manufacture of these compositions, the peroxide can be premixed with the thermoplastic urethane and additional materials to produce a concentrate having a high concentration of peroxide. Then, this concentrate can be introduced into a composition of thermoplastic urethane and additional materials using dry blending or melt mixing. The additional materials also can be added to a color concentrate, which is then added to the composition to impart a white color to golf ball. Instead of melt mixing, the peroxide can be applied to the mixture of thermoplastic urethane by using methods such as dipping or spraying of the peroxide onto half-cups of thermoplastic urethane so that the thermoplastic urethane is coated with the peroxide. This is particularly useful when the layer formed is relatively thin, so that a surface application of the peroxide allows for crosslinking to take place throughout the layer. The coating of peroxide may also be applied to a layer of thermoplastic urethane already positioned on a core. In another method, thermoplastic urethane may be extruded, with or without any of the additional materials discussed above. Then, pellets of this thermoplastic urethane composition formed from this extrusion are sprayed with the peroxide prior to molding. Any combination of the above-mentioned mixing methods can be used to produce a final composition within the scope of the present invention.

A preferred method within the scope of the present invention involves injection molding a core, intermediate layer, or cover of the composition into a cold mold without inducing crosslinking. The product from this process is then compression-molded to induce partial or full crosslinking by use of thermal energy. In another preferred method, injection molding is used to inject the composition around a core positioned in a mold, in which thermal energy is applied to induce crosslinking. In yet another preferred method, an intermediate layer or a cover of the composition can be prepared by injection molding half-shells. The half shells are then positioned around a core and compression molded. The heat and pressure first melt the composition to seal the two half shells together to form a complete layer. Additional thermal energy induces crosslinking of the thermoplastic urethane. In another preferred method, half shells of the composition prior to addition of peroxide are prepared. The half shells are coated with peroxide and compression molded around a core to form a layer and induce crosslinking. In another preferred method, a layer of the composition prior to addition of peroxide is positioned around a core to form a layer. The layer then is coated with peroxide and compression molded to induce crosslinking.

In addition to the above, when used to form a cover layer, a preferred embodiment of the method involves preparing the cover layer using injection molding and forming dimples on the surface of the cover layer, while inducing full or partial crosslinking of the layer during injection molding. Alternately, the cover layer can be formed using injection molding without dimples, after which the cover layer is compression molded to form dimples and also induce full or partial crosslinking.

EXAMPLES

A series of trials were conducted on compositions with ether- or ester-type thermoplastic polyurethanes and organic peroxides, in which the type and concentration of peroxide were varied to demonstrate the effects of crosslinking on mechanical properties. Organic peroxide was introduced to polyurethane using dry-blending or extrusion, followed by injection molding to prepare the specimens discussed below. Various tests were performed on these specimens, and the test results are summarized below in Table 2.

TABLE 2

| Materials | Tensile Strength (psi) | | Modulus (psi) | | |
|---|---|---|---|---|---|
| | @100% Strain | @300% Strain | @50% Strain | @100% Strain | @200% Strain |
| ESTANE58280[1] | 434.9 | 733.8 | 275.9 | 428.1 | 604.7 |
| ESTANE58280/05 wt % DHBP[3] | 943 | 2178.9 | 703.4 | 1247.7 | 1397.9 |
| ESTANE58285[1] | 474.6 | 881.2 | 385.6 | 559.3 | 749.7 |
| ESTANE58285/0.5 wt % DHBP[3] | 700.7 | 1243.2 | 457.2 | 699.7 | 1013.8 |
| ESTANE58810[1] | 1329.3 | 1876.9 | 983.8 | 1319.4 | 1626.7 |
| ESTANE58810/0.3 wt % Trigonox C[4] | 1274.8 | 1780.1 | 951.3 | 1072.9 | 1557.5 |
| ESTANE58810/0.6 wt % Trigonox C[4] | 1344 | 2018.8 | 943.9 | 1323.9 | 1713.3 |
| ESTANE58810/1 wt % Trigonox C[4] | 1395.2 | 2037.8 | 993.9 | 1391 | 1787.7 |
| *ESTANE58810/1 wt % Trigonox C[4] | 1473.3 | 2533.2 | 958.1 | 1467 | 2110 |
| ESTANE58810/1 wt % DHBP[3] | 1500 | 2782.8 | 1066 | 1493.8 | 2061 |
| ESTANE58149[2] | 1781.7 | 2460.2 | 1413.5 | 1780 | 2148.5 |
| ESTANE58149/0.3 wt % Trigonox C[2] | 1801.3 | 2685.6 | 1368 | 1802.4 | 2301 |
| ESTANE58149/1 wt % Trigonox C[4] | 1880.8 | 2754.3 | 1365.5 | 1875.4 | 2405.9 |
| *ESTANE58149/1 wt % Trigonox C[4] | 1948.7 | 2943.1 | 1367.2 | 1920 | 2555.5 |

[1]ether-type thermoplastic polyurethane provided by Noveon, Inc.
[2]ester-type thermoplastic polyurethane provided by Noveon, Inc.
[3]2,5-Dimethyl-2,5-Di (tert-butylperoxy) Hexane provided by Akrochem.
[4]tert-butyl peroxybenzoate provided by Akzo Nobel.
*Test on specimens with additional thermal-treatment.

The data in Table 2 illustrate that tensile stress and modulus at a specific elongation were increased for both ether- and ester-type thermoplastic polyurethanes after reaction with peroxide. That is, the specimens changed in character from thermoplastic to thermoset after reaction with peroxide. The mechanical properties of the specimens were further improved (i.e., made more thermoset in character) by additional thermal treatment.

These test results show that composition within the scope of the present invention can first be easily processed as a thermoplastic material, and then be induced to crosslink using peroxide, to achieve the final properties of a thermoset material. These final properties can be optimized for specific golf ball applications by adjusting the type and ratio of urethane, peroxide, and additional materials in the composition. Additionally, the degree of crosslinking in the composition can be adjusted by selection of the processing method and conditions used in making the compositions.

Although the invention has been disclosed in detail with reference only to the preferred embodiments, those skilled in the art will appreciate that additional compositions can be made without departing from the scope of the invention. Accordingly, the invention is defined only by the claims set forth below.

We claim:

1. A golf ball comprising:
   a core;
   a cover layer encasing the core; and
   one or more intermediate layers situated between the core and the cover layer, at least one of the one or more intermediate layers comprising a composition consisting of:
   a thermoplastic urethane formed as a reaction product of a diol or a polyol with an isocyanate, and
   a peroxide,
   wherein the the thermoplastic urethane is substantially free of unsaturated aliphatic hydrocarbons.

2. The golf ball of claim 1, wherein the peroxide comprises an aliphatic peroxide, an aromatic peroxide, a cyclic peroxide, or mixtures of thereof.

3. The golf ball of claim 1, wherein the comprises a polyester polyol, a polyether polyol, a polybutadiene polyol or mixtures thereof.

4. The golf ball of claim 1, wherein the ratio by weight of thermoplastic urethane to the peroxide ranges between 99.9:0.1 and about 90:10.

5. The golf ball of claim 4, wherein the ratio by weight of thermoplastic urethane to peroxide ranges between 99.9:0.1 and about 93:7.

6. The golf ball of claim 5, wherein the ratio by weight of thermoplastic urethane to peroxide ranges between 99.9:0.1 and about 95:5.

7. The golf ball of claim 6, wherein the ratio by weight of thermoplastic urethane to peroxide ranges between 99.9:0.1 and about 97:3.

8. The golf ball of claim 7, wherein the peroxide has a half-life temperature greater than about 50° C.

9. The golf ball of claim 8, wherein the peroxide has a half-life temperature greater than about 60° C.

10. The golf ball of claim 9, wherein the peroxide has a half-life temperature greater than about 70° C.

11. The golf ball of claim 10, wherein the peroxide has a half-life temperature greater than about 80° C.

12. The golf ball of claim 1, wherein the comprises an inner core and one or more outer cores encasing the inner core.

13. The golf ball of claim 1, wherein the core comprises liquid.

14. The golf ball of claim 1, wherein the thermoplastic urethane comprises ester-type thermoplastic polyurethane, ether-type thermoplastic polyurethane, or mixtures thereof, and the peroxide comprises 5-Dimethyl-2,5-Di (tert-butylperoxy)hexane, (4) tert-butyl peroxybenzoate, or mixtures thereof.

15. The golf ball of claim 1, wherein the peroxide is saturated.

16. A golf ball comprising:
    a core;
    a cover layer encasing the core; and
    one or more intermediate layers situated between the core and the cover layer, wherein the one or more intermediate layers comprises a composition consisting of:
    a thermoplastic urethane that is a reaction product of a diol or polyol with an isocyanate and a chain extender, wherein the thermoplastic urethane is substantially free of unsaturated aliphatic hydrocarbons,
    a peroxide having one hour half-life temperature greater than 50° C., and ionomeric polymer, silicone material, or mixtures thereof,
    wherein the ratio by weight of thermoplastic urethane to the peroxide ranges between 99.9:0.1 and about 90:10.

17. The golf ball of claim 16, wherein the peroxide comprises an aliphatic peroxide, an aromatic peroxide, a cyclic peroxide or mixtures of these.

18. The golf ball of claim 16, wherein the chain extender includes a polyol, a diisocyanate, a diamine or mixtures thereof.

19. The golf ball of claim 16, wherein the polyol comprises a polyester polyol, a polyether polyol, a polybutadiene polyol or mixtures thereof.

20. The golf ball of claim 16, wherein the ratio by weight of reactant product to the peroxide ranges between 99.9:0.1 and about 93:7.

21. The golf ball of claim 20, wherein the ratio by weight of reactant product to the peroxide ranges between 99.9:0.1 and about 95:5.

22. The golf ball of claim 19, wherein the ratio by weight of reactant product to the peroxide ranges between 99.9:0.1 and about 97:3.

23. The golf ball of claim 16, wherein the peroxide has a half-life temperature greater than 60° C.

24. The golf ball of claim 23, wherein the peroxide has a half-life temperature greater than 70° C.

25. The golf ball of claim 24, wherein the peroxide has a half-life temperature greater than 80° C.

* * * * *

UNITED STATES PATENT AND TRADEMARK OFFICE
CERTIFICATE OF CORRECTION

PATENT NO.    : 6,924,337 B2
DATED         : August 2, 2005
INVENTOR(S)   : Kim et al.

It is certified that error appears in the above-identified patent and that said Letters Patent is hereby corrected as shown below:

Column 1,
Line 48, "Monomeric" should be -- Ionomeric --.

Column 17,
Line 25, please delete "the" (second occurrence).
Line 29, should be deleted and read as follows:
    -- The golf ball of claim 1, wherein the polyol comprises a polyester polyol, a polycarbonate polyol, a polyether polyol, or mixtures thereof. --.

Column 17,
Line 53, after "the", please insert -- core --.

Column 18,
Line 22, after "having", please insert -- a --.
Line 35, should be deleted and read as follows:
    -- The golf ball of claim 16, wherein the polyol comprises a polyester polyol, a polycarbonate polyol, a polyether polyol, or mixtures thereof. --.

Signed and Sealed this

First Day of November, 2005

JON W. DUDAS
*Director of the United States Patent and Trademark Office*